United States Patent
Whitehouse

(10) Patent No.: US 6,406,284 B1
(45) Date of Patent: Jun. 18, 2002

(54) FOOD PORTION FORMING

(75) Inventor: John Arthur Whitehouse, Norwich (GB)

(73) Assignee: AEW Engineering Co. Limited, Norfolk (GB)

( * ) Notice: Subject to any disclaimer, the term of this patent is extended or adjusted under 35 U.S.C. 154(b) by 0 days.

(21) Appl. No.: 09/553,134

(22) Filed: Apr. 19, 2000

Related U.S. Application Data

(60) Division of application No. 09/240,142, filed on Jan. 28, 1999, now Pat. No. 6,203,838, which is a continuation-in-part of application No. 08/974,255, filed on Nov. 19, 1997, now abandoned.

(30) Foreign Application Priority Data

Nov. 19, 1996 (GB) .............................................. 9624025

(51) Int. Cl.[7] .......................... A22C 7/00; B29C 33/56; B29C 43/40; B29C 43/50
(52) U.S. Cl. .......................... 425/90; 425/98; 425/299; 425/305.1; 425/397; 425/422
(58) Field of Search .............................. 425/90, 96, 98, 425/100, 397, 422, 299, 304, 305.1; 426/513, 524

(56) References Cited

U.S. PATENT DOCUMENTS

| | | | |
|---|---|---|---|
| 2,643,952 A | * 6/1953 | Crowther | 426/513 |
| 3,413,681 A | * 12/1968 | Manaster | |
| 3,728,136 A | * 4/1973 | Langlands | 426/513 |
| 3,924,012 A | * 12/1975 | Marshall et al. | 426/518 |
| 4,413,461 A | * 11/1983 | Waldstrom | 425/90 |
| 4,474,823 A | * 10/1984 | Nishikawa et al. | 426/513 |
| 4,758,142 A | * 7/1988 | Voss et al. | 425/100 |
| 5,470,596 A | * 11/1995 | Jones | 426/513 |

FOREIGN PATENT DOCUMENTS

| | | | | |
|---|---|---|---|---|
| GB | 2280869 | * | 2/1995 | 426/513 |

\* cited by examiner

*Primary Examiner*—Robert Davis
(74) *Attorney, Agent, or Firm*—Lee, Mann, Smith, McWilliams, Sweeney & Ohlson

(57) ABSTRACT

A method of forming consumer portions from a block of frozen foodstuff is described, in which similarly sized sections of the frozen block are removed by severing for shaping into the differently shaped consumer portions under pressure between tooling of a forming press. Each section is of a similar size and volume so that when the press is operated the severed section is formed into a consumer portion of known volume. Each consumer portion is ejected for further processing after the tooling separates. The surface of each severed section of frozen foodstuff is wetted with a liquid (typically water) just before the pressing operation. Apparatus for performing this method is also described comprising a severing device for severing sections from a block of frozen foodstuff, forming apparatus comprising upper and lower tooling which is adapted to receive a severed section of frozen foodstuff therebetween and is further adapted to close thereon to compress the severed section into a desired shape determined by the internal topography and dimensions of the tooling, an apparatus for expelling the formed product after the tooling separates, and a water jet for wetting each severed foodstuff section before it is subjected to shaping by the tooling.

6 Claims, 3 Drawing Sheets

FOOD PORTION FORMING

This application is a division of U.S. patent application Ser. No. 09/240,142, filed Jan. 28, 1999 and now U.S. Pat. No. 6,203,838, and which is continuation-in-part of U.S. patent application Ser. No. 08/974,255, filed Nov. 19, 1997 and now abandoned.

FIELD OF THE INVENTION

This invention concerns apparatus and methods for forming portions of foodstuffs, particularly frozen foodstuffs.

BACKGROUND OF THE INVENTION

It is known to reshape presized portions of frozen food products in two or three dimensions so as to form an attractive looking shape for the final foodstuff presented to the customer. Such processes have been applied to frozen fish and poultry and can be applied to other foodstuffs as well.

For a general discussion of the background to the invention, see UK Application No. 9316721.1 (2,280,869).

The consumer market to which these processed food portions are supplied, requires the portions to possess a natural appearance, as well as texture and "bite" characteristic of the natural foodstuff.

In practice, it has proved to be quite difficult to reproduce the external appearance of the natural foodstuff, and simultaneously preserve the characteristic texture and "bite".

In particular a fish fillet will generally contain much detailed topography and possess a relatively complex shape. Theoretically the overall shape can be reproduced by placing a small frozen block of fish (known as a charge-piece) into a die-set and applying sufficient pressure to force it into the required overall shape to form in the surface the topography characteristic of a fish fillet. The problem arises however that the high pressure required to achieve reshaping as well as the surface topography, and the relatively large and rapid movement of the frozen product needed to achieve this, can cause a great deal of crush in the charge material, and this results in an unacceptable loss of texture and "bite" in the final product portion.

Ideally the frozen charge-piece should be subject to minimal stress throughout the shaping process in order to retain the desired texture and "bite".

To this end, it has been common to leave foodstuffs in the form produced by the cutting and sawing (ie generally rectilinear) and the final shaped portions have tended to look like short planks or blocks, rather than resemble a natural looking fish fillet, and have merely been coated with breadcrumbs or batter.

It is an object of the present invention to improve the shaping and surface topography of a reshaped frozen portion, whilst retaining bite and texture of the natural foodstuff.

SUMMARY OF THE INVENTION

Surprisingly it has been found that if a controlled volume of liquid water is included in the shaping process applied to the surface of the frozen foodstuff, higher pressures can typically be exerted so as to achieve the shaping and surface finish desired without significant loss of texture and therefore "bite" in the foodstuff.

This can be achieved by spraying a water-mist onto the die-set and/or onto the frozen charge-piece immediately before pressing. The presence of the water has the effect of lubricating the points of contact between the die-set and the frozen charge-piece, and a flow of product within the die-set seems to occur as the die-set is closed on the charge-piece and pressure is applied.

It has been found that the wetted surface regions of frozen charge-piece material can be made to "flow" over steep peaks and valleys and around complex shapes within the die-set, with less pressure on, and therefore crush of, the frozen product.

As a result of this the final portion can be made to look natural both in shape and surface while retaining the original texture and "bite" characteristic of the foodstuff.

Since a good replication of the surface topography characteristic of the foodstuff can thereby be obtained, the final formed product can be presented for sale and consumption without a bread-crumb or batter coating, which has tended to be added to such product in the past so as to disguise the surface finish and/or shape of the foodstuff below.

By using multiple similar pockets in a single die set, so multiples of the final portion shape can be produced from the one die-set, thereby increasing productivity.

According therefore to one aspect of the present invention in a method of forming consumer portions from a block of frozen foodstuff wherein similarly sized sections of the frozen block are removed by severing and shaped into differently shaped consumer portions under pressure between tooling of a forming press, and in which each section is of a similar size and volume so that when the press is operated the severed section is formed into a consumer portion of known volume and wherein each said consumer portion is ejected for further processing after the tooling separates, the improvement comprising the step of wetting the surface of each of the severed sections of foodstuff with a liquid just before the pressing operation, thereby to assist in shaping the sections within the forming press, and in particular to improve the formation of surface features in the consumer portion corresponding to indentations and ridges in the surface of the tooling.

In the aforementioned method the wetting of each severed foodstuff section may occur as it advances towards or as it enters the press tooling or after the severed foodstuff section has entered the tooling. In this last event the liquid used for wetting may be incident on the foodstuff or the tooling or both.

Thus for example the wetting of the foodstuff sections may be achieved by wetting the inside surface of the tooling and transferring the liquid to the foodstuff surface as the tooling comes into contact therewith.

The method may also comprise severing elongate lengths of foodstuff from a frozen block to form so-called planks, individually advancing each plank into a severing and forming press so that the leading end of the plank is appropriately positioned between upper and lower parts of the tooling, operating the latter so as to sever the leading end from the remainder of the plank and under pressure forming the severed end into the differently shaped frozen consumer portion which is removed for further processing after the tooling separates.

Alternatively the final severing step may be separated from the forming tool so that the latter only has to compress the severed section of frozen foodstuff and does not have to sever it from the remainder of a larger piece or plank of the material.

In a method in which the leading end of the plank is severed by the tooling, the advancement of the foodstuff between the tooling is achieved by advancing the plank incrementally so as to present the leading end of the plank between the severing and forming tooling as required.

Where the severing step is separate from the forming step, the frozen material is severed into individual identical sections which are then transported individually into the forming press tooling.

According to another aspect of the present invention, apparatus adapted to perform the method of the invention comprises severing means for severing sections from the block of foodstuff, forming apparatus comprising upper and lower tooling which is adapted to receive a severed section of frozen foodstuff therebetween and is further adapted to close thereon to compress the severed section into a desired shape determined by the internal topography and dimensions of the tooling, means for expelling the formed product after the tooling separates, a supply of liquid, typically water, under pressure, valve means controlling the flow of the liquid through discharge means, thereby to wet each severed foodstuff section before it is subjected to shaping by the tooling.

In one embodiment the upper and lower tooling is adapted to sever a section of frozen foodstuff material from an elongate length of the material which has been advanced between the tooling and thereafter to shape the severed leading end of the material into the desired shape.

In another embodiment all of the severing of the sections of frozen material from the block is performed upstream of the press and conveying means is provided for presenting the similar severed foodstuff sections to the tooling, one by one, and the tooling is only required to compress and shape the sections of frozen foodstuff presented thereto.

Where planks of frozen foodstuff are generated by the severing of a rectilinear block of frozen material, the ends of the planks may be wetted and freeze welded end to end so as to form a continuous length of material to be presented to a final severing step to form sections for supply to the pressing operation, so that if the plank-lengths do not equate to a whole number multiple of the section size required by the tooling, there will be no waste ends to be discarded.

The wetting of the foodstuff prior to the forming step may be performed by means of a liquid jet.

The liquid jet may be located in advance of the forming tooling so as to spray water over each severed section before it enters the tooling.

Alternatively the water jet may be directed onto the tooling so that the surface of the tooling is wet before the foodstuff is presented thereto and the foodstuff is wetted by coming into contact with the water on the surface of the tooling before the pressure is applied.

In another arrangement the jet is arranged to spray water onto the foodstuff sections when present in the tooling so that foodstuff and tooling are wetted before the tooling closes.

The wetting of the severed foodstuff sections before the forming step facilitates the shaping of the foodstuff into the desired shape.

In a particularly preferred arrangement, severed sections of frozen foodstuff each of the same size and weight, are stacked one above the other in a magazine and the conveying means is adapted to remove the section from the bottom of the stack, present it to a water jet for wetting and transfer it to the open tooling of the forming press. Additional severed frozen sections can be added to the top of the stack in the magazine to replenish those removed from the bottom of the stack, thereby enabling the process to operate continuously.

In accordance with the invention described in UK 2280869, the severed sections supplied to the top of the stack are preferably formed by severing the leading end of planks of frozen foodstuff material using a double shear tool. So as to reduce the volume of waste material, the ends of the planks are wetted and freeze welded together to form a continuous length of material for presentation to the double shear tool so that they can be cut to any size without reference to the lengths of the original planks.

BRIEF DESCRIPTION OF THE DRAWING

The invention will now be described by way of example, with reference to the accompanying drawings, in which:

As shown in FIG. 1, the forming machine includes a top die 10 having a shaped cavity 12 in its underside which when lowered against a flat lower die 14 will cause a rectilinear section of frozen foodstuff located between dies 10 and 12 to be shaped into a consumer portion which resembles a fish fillet or chicken breast as appropriate.

Figure 1:
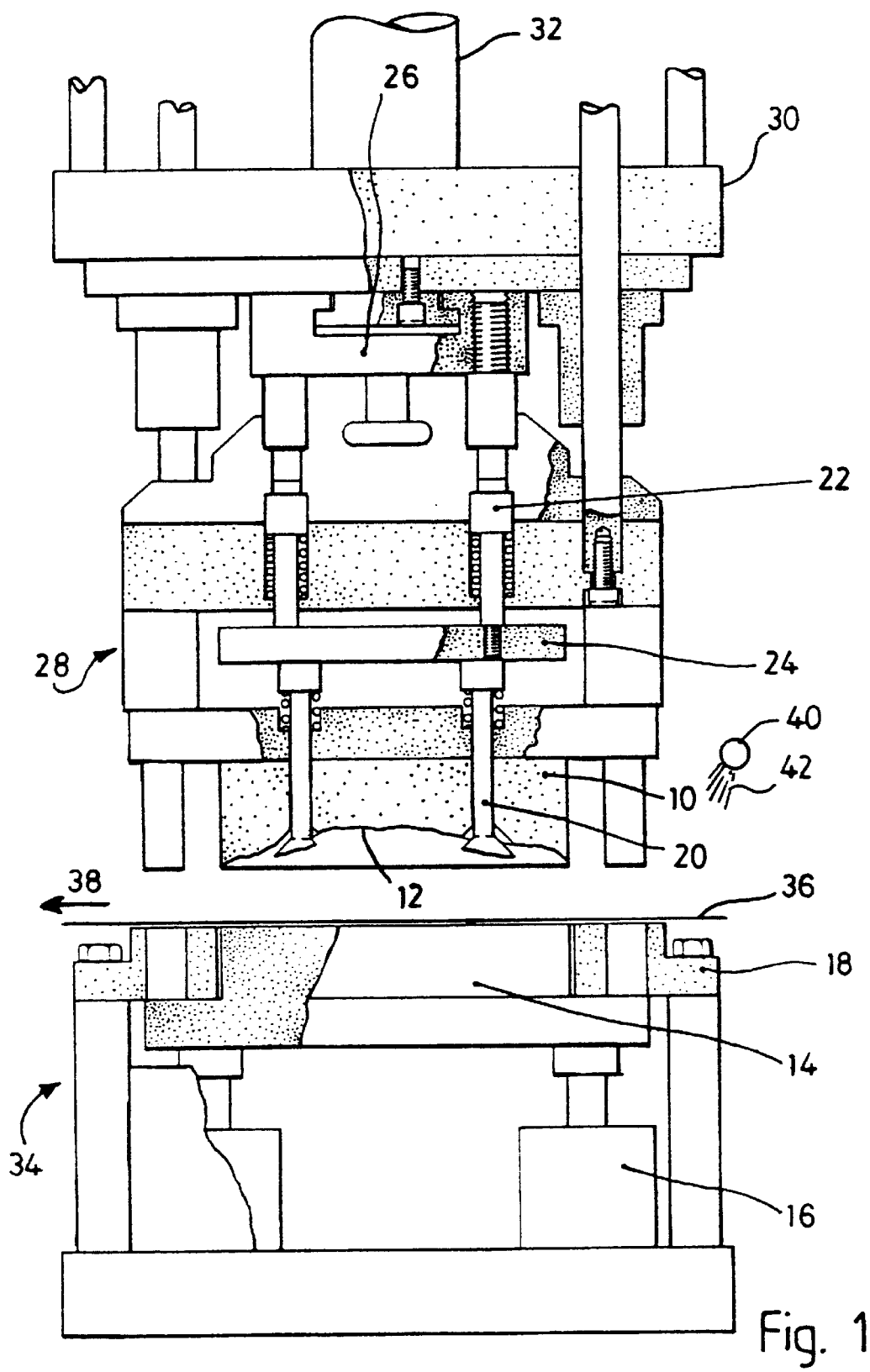
FIG. 1 is a diagrammatic view of a forming press used to form shaped consumer portions of frozen foodstuff.

The invention is not limited to a plain lower tool 14 and the latter may itself be shaped if it is desired to produce double sided consumer portions. However in general the underside of such portions is preferably flat for packaging and handling by the consumer after cooking.

The bottom die 14 includes optional lower ejectors identified by reference numeral 16 and is contained within a bottom die outer plate 18.

The foodstuff is reliably separated from the top die by means of ejector pins one of which is denoted by reference numeral 20 which are forced in a downward sense by shafts such as 22 after the top die is raised after a pressing operation.

Ejectors 20 are acted on through the intermediary of an ejector plate 24 and the ejector operating pins are acted on through a bar 26.

The whole upper assembly generally designated 28 is carried by a top plate 30 acted on by a hydraulic cylinder 32 to raise and lower the assembly 28 relative to the bottom die assembly generally designated 34. A thin flexible membrane conveyor 36 extends across the bottom die plate 14 for conveying severed frozen foodstuff sections into the position required below the top die 10 and after the forming operation for removing the shaped foodstuff portions in the general direction of the arrow 38.

A spray bar 40 is located upstream of the conveyor 36 so as to spray a jet of water 42 onto the consumer portions on the conveyor 36 before they pass between the shaping tooling 10 and 14. Wetting the surface of the frozen sections before they are compressed by the tooling has been found to assist in the end shape of the consumer portions. It is believed that the film of ice which is formed by the water sprayed onto the frozen section facilitates the movement and relocation of the frozen material within the two die plates as the latter are forced together by the hydraulic press 32.

Although not shown, the water jet may be directed more between the two die plates so that water is sprayed onto the die plates themselves or onto the severed foodstuff sections as they are located between the die plates. The precise position may be determined by experiment with reference to the foodstuff which is being formed.

Figure 2:
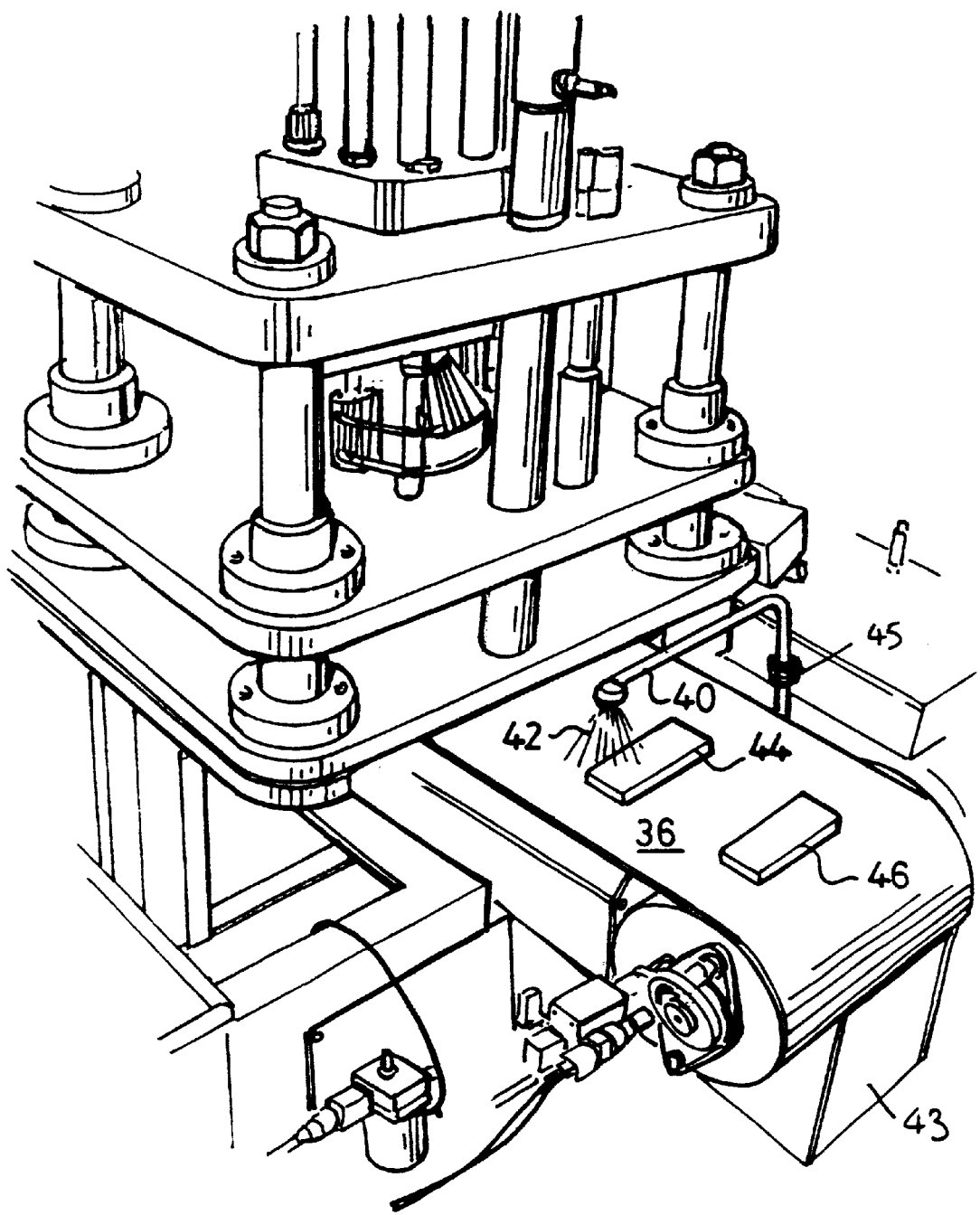
FIG. 2 is a perspective view of apparatus constructed in accordance with the invention in which a water jet is provided in advance of the tooling to wet the severed frozen foodstuff sections before they are compressed in the tooling.

FIG. 2 illustrates apparatus constructed in accordance with the invention and embodying the principles shown in the diagrammatic view of FIG. 1. Similar reference numerals have been used as appropriate. The spray bar 40 is shown extending from a pressurised container 43 containing water, the release of which therefrom is controlled by a valve 45 synchronised to discharge water from the spray bar as sections 44, 46 pass therebelow.

In FIG. 2, the severed rectilinear frozen food portions 44 and 46 are visible on the conveyor 36.

Figure 3:
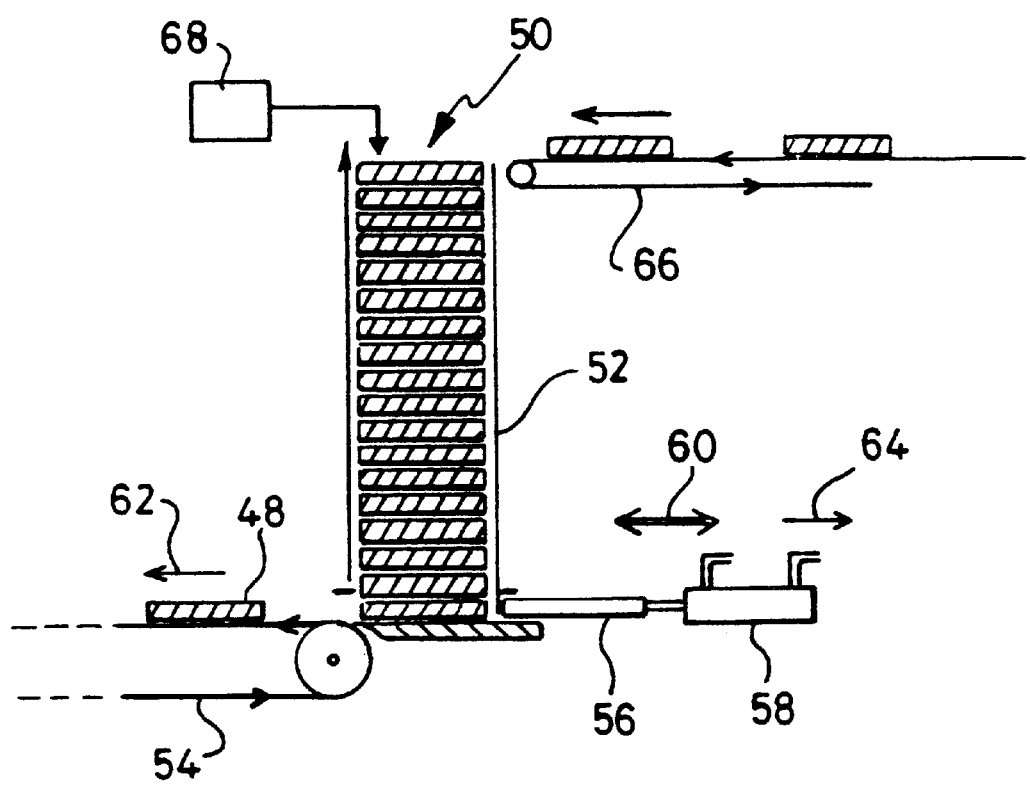
FIG. 3 is a diagrammatic view of a magazine and escapement mechanism for releasing severed frozen foodstuff sections onto a conveyor for feeding the machine shown in FIG. 2.

FIG. 3 illustrates diagrammatically how severed portions such as 48 can be removed one at a time from a stack 50. The latter is contained within a magazine 52 which extends vertically above a conveyor belt 54 and the bottom of the magazine 52 includes an opening through which a pusher 56 can move to engage the rear of the lowermost frozen foodstuff section in the stack. A pneumatic double-acting cylinder 58 moves the pusher 56 in the direction of the arrow 60 so as to push the lowermost section onto the conveyor 54 to be transported therealong in the direction of arrow 62 and is also movable in a rearward sense in the direction of arrow 64 so that when relocated to the position shown, the stack of severed foodstuff sections 50 can drop down to occupy the position shown so that another severed section is available at the bottom of the stack to be pushed out by the pusher 56 the next time it is advanced by the cylinder 58.

The top of the stack can be regularly added to by means of a feed conveyor 66. A level switch 68 detects when the stack is full and either arrests the motion of conveyor 66 to prevent the stack becoming over filled or simply diverts incoming product to another magazine or reservoir.

The conveyor 54 may be the same as the conveyor 36 shown in FIGS. 1 and 2 or may be a separate feed conveyor for delivering product such as 48 to the conveyor 36.

Although not shown, the conveyor 66 may be adapted to deliver a continuous length of frozen foodstuff in the form of a plank to the upper end of the magazine 52 and a guillotine (not shown) is provided so as to sever the protruding end of the plank above the magazine to allow it to drop onto the top of the stack 50 in the magazine. By incrementing the plank at an appropriate rate and dropping severed sections onto the top of the stack 50 at approximately the same rate as they are removed for delivery to the forming press such as shown in FIGS. 1 and 2, so the process can be rendered virtually continuous and the stack of the severed portions 50 in the magazine 52 provides a buffer to accommodate slight alterations in the flow or handling of the product and to allow continuous operation of the forming tool even if the supply of product to the top of the stack is interrupted for a short time.

Where the forming tool comprised of the upper and lower dies 10 and 14 is adapted to sever product as well as form the severed section into a consumer portion, the conveyor 36 may be replaced by a feeding device for feeding a continuous length of frozen foodstuff plank between the upper and lower dies and advancing the plank by the appropriate distance so that the appropriate volume of material is located between the upper and lower dies for severing and pressing into the consumer portion. In this event a buffer magazine and escapement mechanism such as shown in FIG. 3 would not normally be required. Furthermore, the location of the water jet 40, 42 would be selected so as to ensure that the region of the frozen plank of foodstuff which is wetted by the jet is that which is to be positioned immediately below the tooling or which has already been positioned between the tooling.

What is claimed is:

1. Apparatus for forming consumer products from a block of frozen foodstuff, comprising severing means for severing sections from the block of frozen foodstuff, forming apparatus comprising upper and lower tooling which is adapted to receive a severed section of frozen foodstuff therebetween and is further adapted to close thereon to compress the severed section into a desired formed product shape determined by the internal topography and dimensions of the tooling, a supply of pressurised water, discharge means for spraying water such that the surface of each severed foodstuff section becomes wetted before it is subjected to shaping by the tooling, thereby to assist in shaping the sections within the forming apparatus, and means for expelling the formed product after said tooling separates.

2. Apparatus as claimed in claim 1, wherein the upper and lower tooling is adapted to sever a section of frozen foodstuff material from an elongate length of the material which has been advanced between the tooling and thereafter to shape the severed leading end of the material into the desired shape.

3. Apparatus as claimed in claim 1, wherein the severing of the sections of frozen material from the block is performed upstream of the press and conveying means is provided for presenting the similar severed foodstuff sections to the tooling, one by one, and the tooling is only required to compress and shape the sections of frozen foodstuff presented thereto.

4. Apparatus as claimed in claim 1, wherein the discharge means is a water jet which is directed onto the tooling so that the surface of the tooling is wet before the foodstuff is presented thereto and the foodstuff is wetted by coming into contact with the water on the surface of the tooling before the pressure is applied.

5. Apparatus as claimed in claim 1, wherein the discharge means is a water jet and valve means is operated synchronously with the passage of foodstuff sections to cause water under pressure to be supplied to the jet, thereby to spray water onto the foodstuff sections present in the tooling so that both foodstuff and tooling are wetted before the tooling closes.

6. Apparatus for forming consumer products from a block of frozen foodstuff, comprising severing means for severing sections from the block of frozen foodstuff, forming apparatus comprising upper and lower tooling which is adapted to receive a severed section of frozen foodstuff therebetween and is further adapted to close thereon to compress the severed section into a desired formed product shape determined by the internal topography and dimensions of the tooling, a supply of pressurised water, discharge means for spraying water such that the surface of each severed foodstuff section becomes wetted before it is subjected to shaping by the tooling, thereby to assist in shaping the sections within the forming apparatus, and means for expelling the formed product after said tooling separates, wherein the discharge means comprises a water jet located in advance of the forming tooling so as to spray water over each severed section before it enters the tooling, and valve means to control the discharge of the water from the jet so as to occur when a severed foodstuff section is located therebelow.

* * * * *